US008265624B2

(12) United States Patent
Güner et al.

(10) Patent No.: US 8,265,624 B2
(45) Date of Patent: Sep. 11, 2012

(54) METHOD AND SYSTEM FOR BROADCAST MESSAGE TRANSMISSION IN MOBILE SYSTEMS

(75) Inventors: Refi-Tugrul Güner, Baden (AT); John Thomas Moring, Encinitas, CA (US); Justin Paul McNew, Del Mar, CA (US); Khaled I. Dessouky, Studio City, CA (US)

(73) Assignee: Kapsch TrafficCom AG, Vienna (AT)

( * ) Notice: Subject to any disclaimer, the term of this patent is extended or adjusted under 35 U.S.C. 154(b) by 54 days.

(21) Appl. No.: 12/824,750

(22) Filed: Jun. 28, 2010

(65) Prior Publication Data
US 2010/0267344 A1 Oct. 21, 2010

Related U.S. Application Data

(63) Continuation-in-part of application No. 11/859,978, filed on Sep. 24, 2007.

(51) Int. Cl.
*H04W 4/00* (2009.01)
*H04B 7/00* (2006.01)

(52) U.S. Cl. ........................................ 455/434; 455/515

(58) Field of Classification Search .......... 455/450–453, 455/445–447, 404.1, 404.2, 521, 455, 575.9, 455/99, 98, 96, 569.2, 422.1, 423, 425; 379/37, 379/47, 42; 340/902–903, 7.58, 9.11; 343/709, 343/710, 705, 711–713
See application file for complete search history.

(56) References Cited

U.S. PATENT DOCUMENTS

| 5,504,938 | A  | * | 4/1996 | Redden .................... 455/436 |
| 6,765,495 | B1 | * | 7/2004 | Dunning et al. ............. 340/903 |
| 7,098,804 | B2 | * | 8/2006 | Tringali et al. .............. 340/902 |
| 2004/0073361 | A1 |  | 4/2004 | Tzamaloukas et al. |
| 2005/0099321 | A1 | * | 5/2005 | Pearce ................... 340/995.13 |
| 2005/0276266 | A1 | * | 12/2005 | Terry .......................... 370/394 |
| 2006/0262750 | A1 | * | 11/2006 | Walton et al. ................ 370/329 |
| 2009/0016285 | A1 |  | 1/2009 | Li et al. |

FOREIGN PATENT DOCUMENTS

| WO | WO 2006/008722 A1 | 1/2006 |
| WO | WO 2006/011109 A1 | 2/2006 |
| WO | WO 2010/011796 A2 | 1/2010 |

OTHER PUBLICATIONS

Extended European Search Report for corresponding European Patent Application No. 11450076.2, dated Sep. 28, 2011, citing the references listed above, 8pp.

* cited by examiner

*Primary Examiner* — Melody Mehrpour
*Assistant Examiner* — Emem Stephen
(74) *Attorney, Agent, or Firm* — Christie, Parker & Hale, LLP.

(57) ABSTRACT

A method and device for dynamically changing transmission parameters of broadcast messages transmitted and received by a mobile unit. The method and device include monitoring transmission channel characteristics; dynamically adjusting the transmission parameters of a message based on the monitored transmission channel characteristics; and broadcasting the message using the adjusted transmission parameters. The transmission parameters may include one or more of transmission power, error code rate, and modulation rate. The transmission channel characteristics include one or more of the group consisting of received message density, channel congestion, detected number of message collisions, and signal to interference ratio.

21 Claims, 8 Drawing Sheets

METHOD AND SYSTEM FOR BROADCAST MESSAGE TRANSMISSION IN MOBILE SYSTEMS

CROSS-REFERENCE TO RELATED APPLICATION(S)

This patent application is a Continuation-In-Part of U.S. patent application Ser. No. 11/859,978, filed on Sep. 24, 2007 and entitled "Method And System For Broadcast Message Rate Adaptation In Mobile Systems," the entire content of which is hereby expressly incorporated by reference.

FIELD OF THE INVENTION

The present invention relates generally to the field of mobile wireless communication systems, particularly those employing messages repeatedly transmitted by the mobile units. The present invention provides a method for adapting the frequency of transmission of certain message broadcasts based on observed channel characteristics.

BACKGROUND

According to the US National Highway Traffic Safety Administration, traffic crashes were the leading cause of death for the age group 4 through 34 in 2003. It is known that traffic fatalities increase dramatically with an increase in vehicle speed. Work in the area of Intelligent Transportation Systems envisions a wireless communications infrastructure encompassing both fixed roadside units and mobile vehicular units mounted in commercial and private motor vehicles. One application of such a system is to share real-time safety information among vehicles in a local area. For example, a basic safety message that is intended to be broadcast repeatedly to surrounding vehicles contains data elements such as, position, motion, control, and vehicle size.

These messages and others are transmitted on a wireless channel with limited capacity. If more messages are being generated than can be accommodated by the communications channel, messages will be delayed and possibly lost, negatively affecting the safety of the vehicles and their occupants.

Given the limited spatial range of such wireless systems in a nominal highway situation, a vehicle may be in range of a dozen or so other vehicles at a time. Safety messages broadcast at one message per second per vehicle would impose a light load on the communications channel. If the traffic slows to a "bumper-to-bumper" density, however, there may be hundreds of vehicles within range. In this scenario, the message volume may overwhelm the communications system, reducing its ability to serve its purpose of providing timely delivery of critical information. Since the critical information (e.g., location) associated with a slower moving vehicle is less dynamic than that of a fast-moving vehicle, it is not necessary to update the slower vehicles' information as frequently. Likewise, under otherwise benign conditions, reporting rate can be lessened. Conversely, under adverse conditions, such as precipitation or road damage, traffic safety will benefit from more frequent updates.

U.S. Pat. Nos. 6,240,294 and 6,600,927 address periodic position reports transmitted by mobile military vehicles. They describe two reporting modes: a periodic (PER) mode where position updates are sent at a fixed interval (e.g., every two minutes), and a movement (MOV) mode where position updates are issued when the unit has moved a pre-defined distance (e.g., 300 meters) from the location of its last report. The system described in U.S. Pat. No. 6,600,927 also adjusts the time and distance thresholds based on a measurement of network loading, which is defined as a function of channel idle time. The primary objective of this system is to track the coarse location of the reporting military units.

For example, FIG. 6 shows a vehicle 60, in a MOV mode that sends a first position report. It then moves over an extensive and complex course 61. However, the vehicle 60 does not send a position update as long as it does not move more than a predefined distance from its previously reported position and thus its net movement never exceeds the distance criterion (indicated by radius 62), so it never sends a subsequent update. Furthermore, unicast addressing can provide reliable message delivery through feedback from the recipient, for example, via an ARQ (automatic repeat-request) protocol. However, unicast is not efficient for messages sent to many recipients, since a separate message would need to be sent to each recipients and thus consuming unnecessary channel capacity. Unicast also is not effective for messages sent to unknown recipients, since the address of a nearby desired recipient may not be known.

Repeated transmissions, which means sending a broadcast message more than once, generally increases the chance that at least one copy will be received. However, the disadvantage is unnecessary increase in channel loading.

Similarly, sending a message at higher transmission power increases the chance that the message will be received. However, the higher power negatively impacts the performance of other nearby mobile units by increasing their received interference power level and thus decreasing their ability to receive other traffic.

Alternatively, the sender can transmit its messages in a more robust form, which is more likely to be received. For example, a more powerful forward error correcting (FEC) code (e.g., rate ½ vs. rate ¼); or a more robust modulation rate (e.g., a binary code vs. an 8-level code) could be used. The disadvantage with this method is that the more robust messages are of longer duration and therefore consume more channel capacity, when a less robust, more efficient message may have been delivered with no problem.

Therefore, there is a need for an intelligent vehicle that is capable of broadcasting repeated safety messages at a high albeit variable, environment dependent rate, so that nearby vehicles can quickly adapt to its presence and its movements. The receipt of a timely safety message potentially allows the recipient to avoid collision with the reporting vehicle, for example, by moving out of its path.

SUMMARY

The present invention provides a method for adapting the frequency of transmission of certain message broadcasts based on observed channel characteristics. The present invention reduces the communication channel loading in a benign scenario by changing transmission parameters such as modulation type, coding rate, and/or transmit power, while serving the safety objectives of the reporting system by increasing the message rate during high-risk situations.

In some embodiments, the present invention is a method and device for dynamically changing transmission parameters of broadcast messages transmitted by a mobile unit. The method and device include monitoring transmission channel characteristics; dynamically adjusting the transmission parameters of a message based on the monitored transmission channel characteristics; and broadcasting the message using the adjusted transmission parameters. The transmission parameters may include one or more of transmission power, error code rate, and modulation rate. The transmission channel characteristics include one or more of received message density, channel congestion, detected number of message collisions, and measured link quality (such as signal to interference ratio, signal to noise ratio, etc.).

DETAILED DESCRIPTION

In some embodiments, the present invention uses safety criteria including vehicle (mobile unit) speed to regulate message transmission (reporting) rate. A higher reporting rate from a fast-moving vehicle will provide receiving vehicles more timely and therefore more accurate assessments of the reporting vehicle's current state, and increase the likelihood of avoiding a collision.

In some embodiments, the present invention allows the sending unit to selectively adjust transmission parameters appropriate to the current conditions, based on the observed channel characteristics, thus improving the probability of message delivery and reducing channel loading.

In some embodiments, the present invention considers the prevailing driving conditions, increasing the reporting rates when conditions are adverse. According to US Department of Transportation data, over 20% of vehicle crashes and crash-related injuries occur under adverse road or weather conditions. Therefore, more frequent safety message updates also benefit the recipients under adverse road or weather conditions, for example, when visibility is poor, road surface is wet, etc.

In some embodiments, the present invention includes additional attributes such as, different ways to determine communications loading, and the use of predefined maximum and minimum reporting rates.

Yet, in some embodiments, the present invention uses a combination of these criteria to regulate and determine the appropriate message transmission rates.

Figure 1:
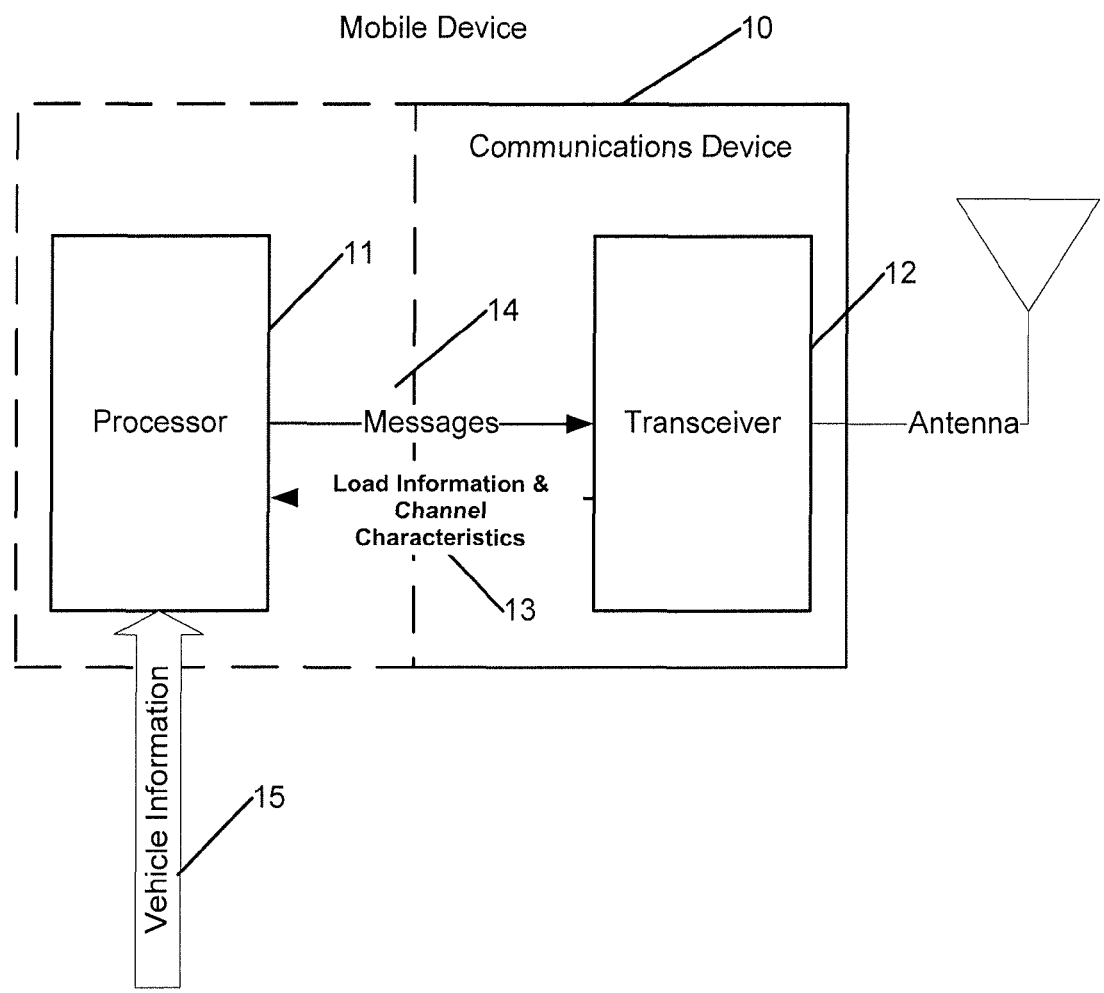
FIG. 1 shows an exemplary block diagram of a mobile device, according to some embodiments of the present invention.

FIG. 1 shows an exemplary block diagram of a mobile device included with a mobile unit, according to some embodiments of the present invention. The mobile device 10 includes a radio transceiver 12 that provides access to the wireless communication channel as well as implementing the appropriate protocols to allow interaction with other like devices. The device also includes a processor module 11, which may include associated memory and may operate within the transceiver component or in a separate physical housing. The processor module 11 collects vehicle information 15 reflecting current vehicle speed and other information, and creates messages 14 for delivery to the transceiver for subsequent broadcast on the wireless medium. The processor module 11 further adjusts the message transmission rate based on the speed of the vehicle (mobile unit). The processor 11 adjusts the transmission rate by controlling how often it passes messages 14 to the transceiver 12 for transmission on the wireless medium. In some embodiments, the transceiver provides communications channel loading information and observed channel characteristics 13 to the processor, reflecting the current utilization of the communication channel.

Figure 2:
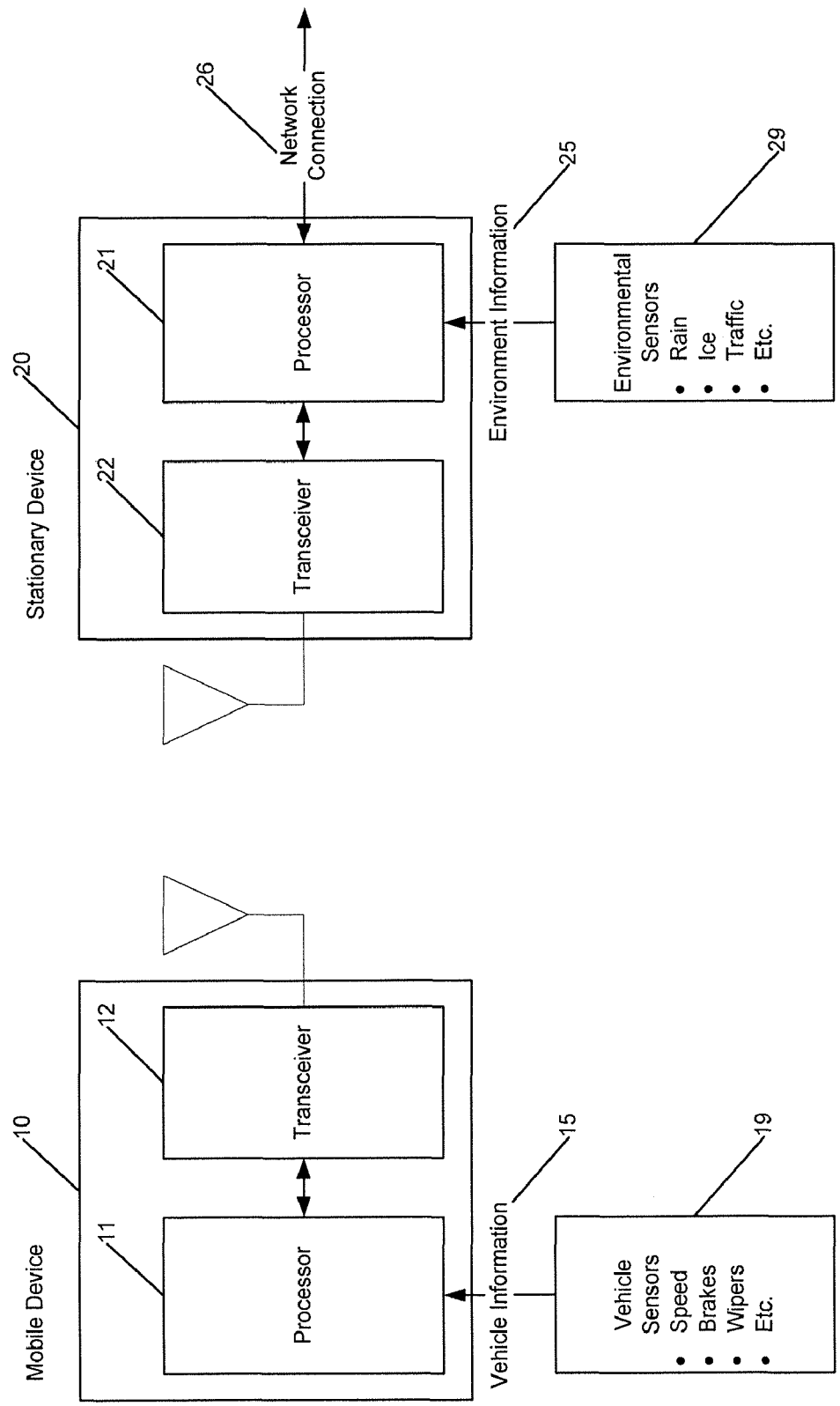
FIG. 2 illustrates an exemplary block diagram of a system incorporating a mobile message reporting device and a stationary message processing device, according to some embodiments of the present invention.

FIG. 2 illustrates an exemplary block diagram of a system incorporating a mobile message reporting device and a stationary message processing device, according to some embodiments of the present invention. Vehicle sensors 19 provide vehicle information 15 collected from the vehicle (e.g., speed, windshield wiper status). The mobile device (and other similar devices not shown) generate and deliver messages to a stationary device 20 over the wireless medium. The stationary device includes a transceiver 22. It also includes a processor 21 that accepts the reports from the mobile devices. Similarly, the messages may be received and processed by other mobile devices.

The message processor module 21 may also collect environmental information 25 from environmental sensors, including such information as traffic speed or density, or road surface conditions. In some embodiments, the message processor module 21 broadcasts environmental information to the mobile devices for use in their message rate determination calculations. In an alternate embodiment, the message processor module 21 calculates the message rate and broadcasts the rate to be used by the reporting mobile devices.

An embodiment of the stationary device also includes a network connection 26, which provides additional information that may not be available to local sensors, such as road construction or lane closures. This information is used similarly to the environmental information in adjusting the mobile message transmission rate.

Figure 3:
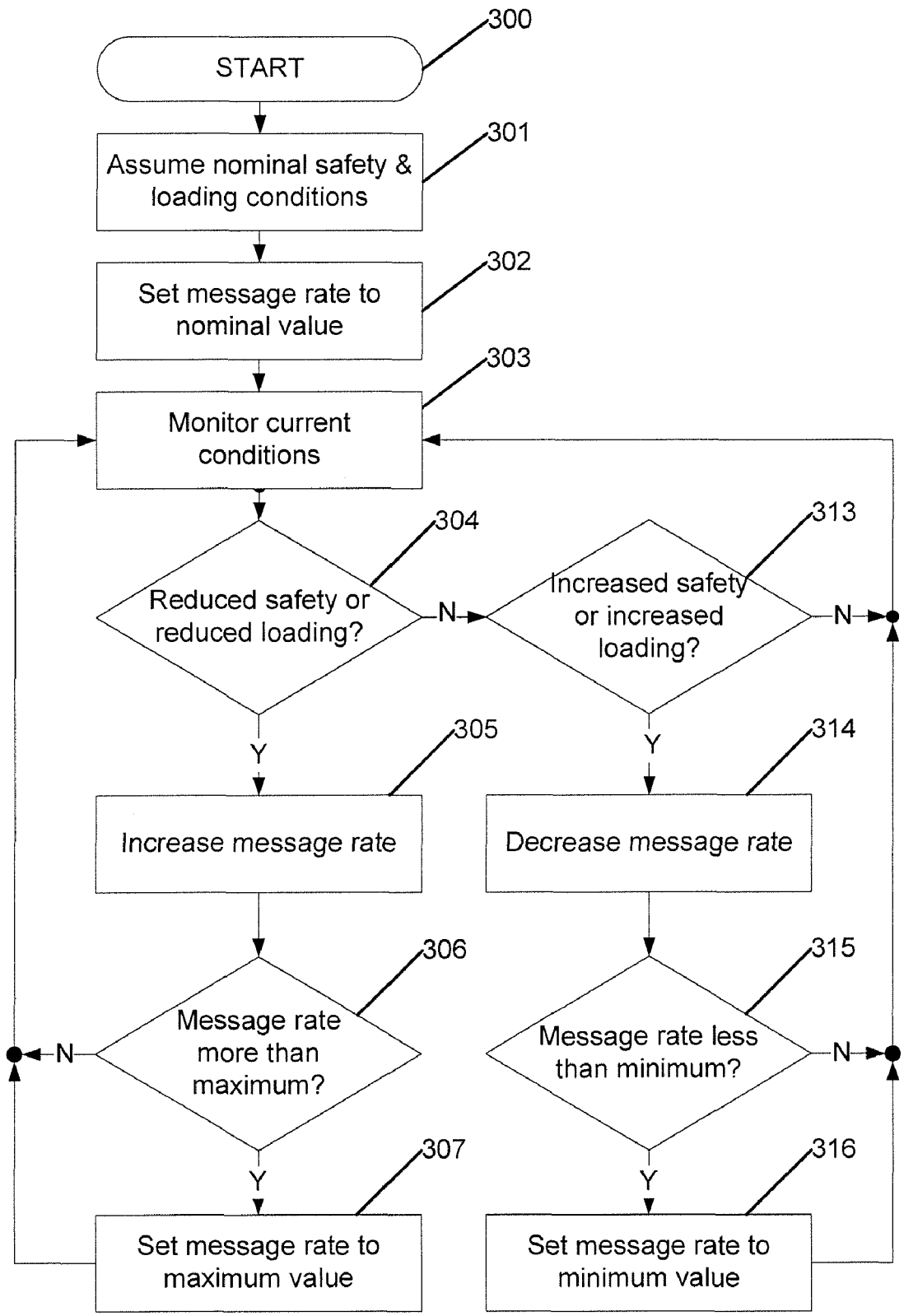
FIG. 3 illustrates an exemplary process flow for message determination, according to some embodiments of the present invention.

FIG. 3 illustrates an exemplary process flow for message determination, according to some embodiments of the present invention. In block 300, the process initializes its safety metrics/conditions (e.g., vehicle speed, road conditions). In block 301, channel loading metric are set to nominal values. In block 302, the message rate is set accordingly to a nominal default value. The safety metrics/conditions and/or the message rate maybe pre-set or programmed in the system, or transmitted to the system as its initial conditions.

In block 303 the process then monitors the current safety and channel characteristics. If the monitored safety factors are reduced from the nominal or previous values (indicating a higher potential for collision) and/or channel loading is reduced (indicating opportunity for more frequent updates) (block 304), the message transmission rate is provisionally increased in block 305. However, if the message transmission rate increase exceeds a maximum predefined ceiling in block 306, the message rate is set to the maximum allowed value, in block 307. If on the other hand, safety factors increase (indicating less risk of collision) and/or channel loading increases (indicating potential for a communications bottleneck) (block 313), the message rate is provisionally reduced in block 314. The decreased rate is compared to a predefined floor value in block 315, and prevented from falling below the minimum allowed value in block 316.

In one embodiment, the message rate is inversely proportional to the vehicle (mobile unit) speed. For example, an equation similar to the following may be used to determine the rate.

$$R = \text{MIN}(\text{MAX}(R_{min}, V/a), R_{max}) \quad \text{(Eq. 1)}$$

Figure 4:
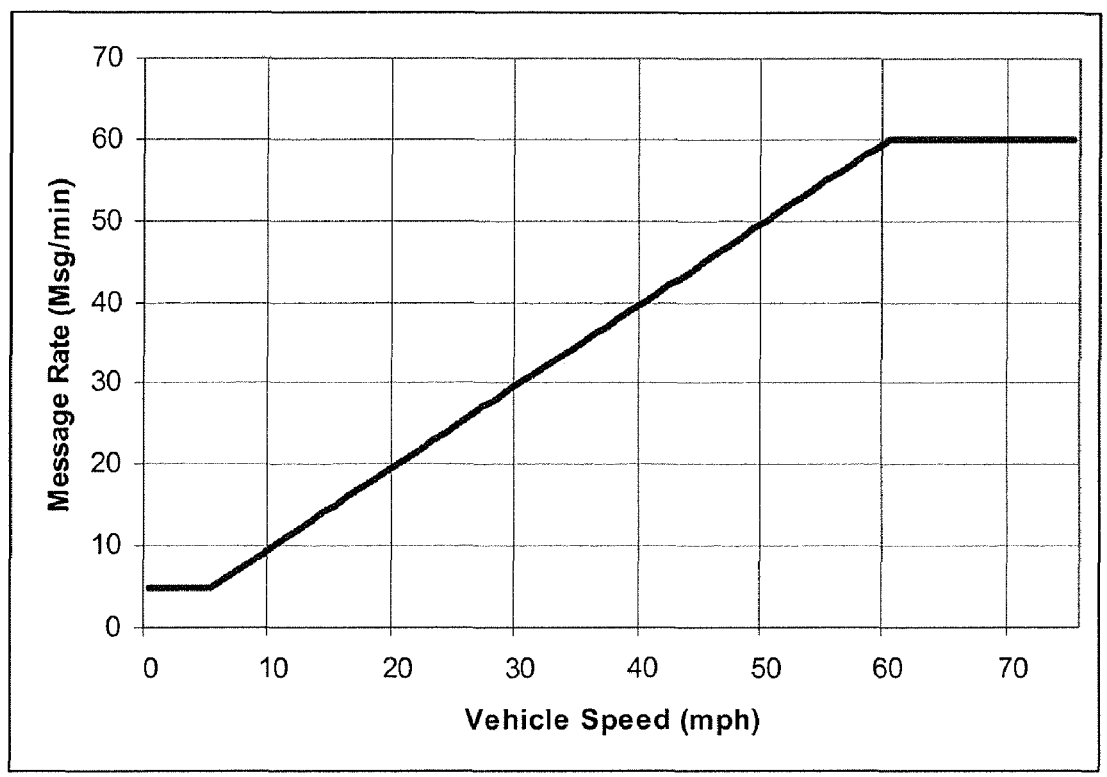
FIG. 4 shows results of an exemplary message rate calculation based on a vehicle speed, according to some embodiments of the present invention.
Figure 5:
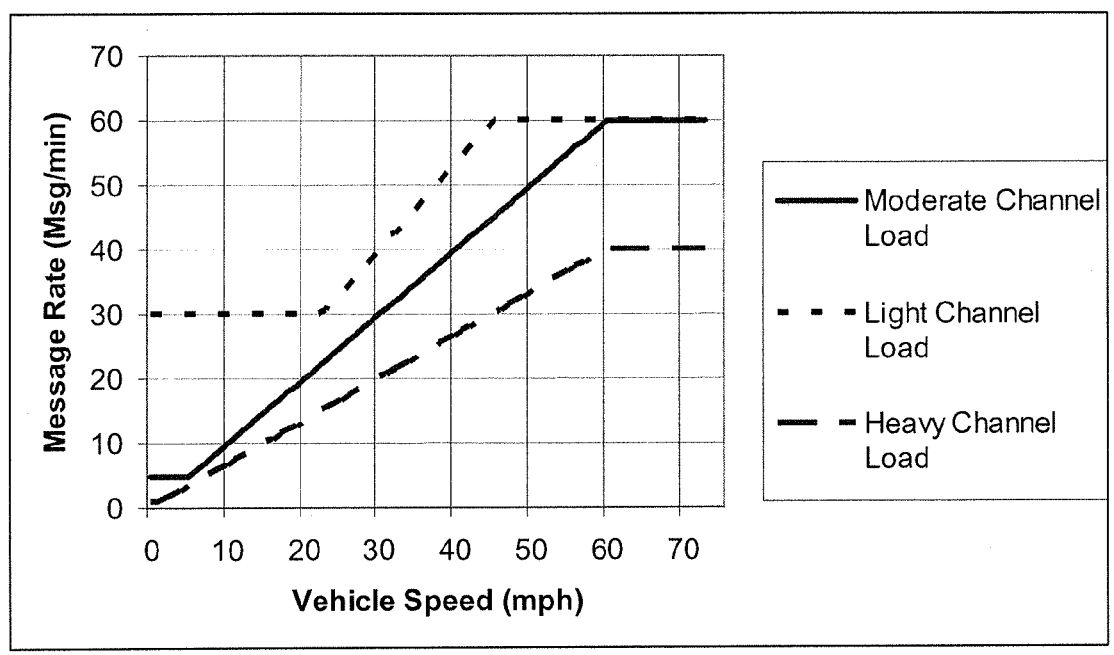
FIG. 5 shows results of an exemplary message rate calculation based on a vehicle speed and channel loading, according to some embodiments of the present invention.
Figure 6:
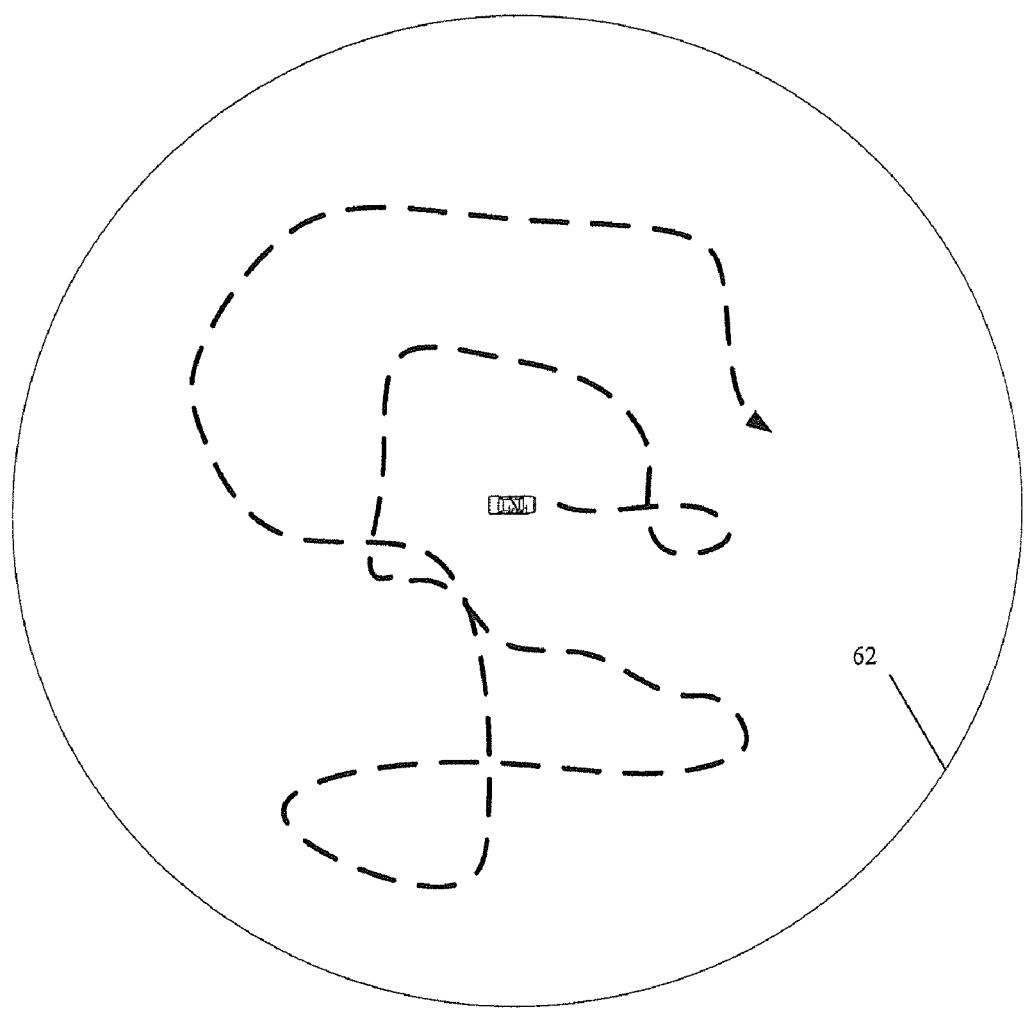
FIG. 6 shows the movement course of a mobile device according to the prior art.

Where,
R is the message rate
V is the vehicle speed
a is a scaling factor
$R_{min}$ is the minimum allowed value of R
$R_{max}$ is the maximum allowed value of R
MIN(x, y) chooses the minimum of x and y
MAX(x, y) chooses the maximum of x and y
As an example, FIG. 4 shows the message rate for a range of vehicle speeds, when:
R is in messages per minute
V is in miles per hour
a=1 mile-minute/message-hour
$R_{min}$=5 messages per minute
$R_{max}$=60 messages per minute In some embodiments of the invention, the message generator also takes into account the total loading of the communications channel. A highly loaded channel causes devices to scale back their transmissions, while a lightly loaded channel allows more frequent transmissions. There are a number of known methods for characterizing channel loading, including number of transmission collisions, number of transmissions received per time interval, proportion of time that the channel is idle (or conversely, busy), the average radio energy received over a given time interval, and others. Any of these known methods may be suitable for use by the message rate adaptation.

As an example, three different parameter sets are chosen to accompany the message rate calculation (see, Eq. 1, above). A first set is used when the channels is lightly loaded (e.g., less than 30% channel busy). A second set is used when the channel is moderately loaded (e.g., from 30% to 70%), and a third set is used when the channel is heavily loaded (e.g., greater than 70%). Exemplary parameters are shown in Table I below, where the "moderate load" parameters equal those in the previous example.

TABLE I

|  | Light Load | Moderate Load | Heavy Load |
|---|---|---|---|
| a | 0.75 | 1 | 1.5 |
| $R_{min}$ | 30 | 5 | 1 |
| $R_{max}$ | 60 | 60 | 40 |

In some embodiments, at least one of the parameters "a", Rmin and Rmax, is calculated as a function of the communication loading, rather than taking a predefined value.

In some embodiments, the message rate calculation takes into account the prevailing (environmental) conditions. Under adverse (environmental) conditions, the reporting rate tends to be faster. Prevailing conditions may include precipitation, reduced visibility, road hazards, etc. The prevailing conditions may further include slick pavement, limited visibility, road construction, object in roadway, accident, dense traffic, and anomalous driving behavior.

These conditions may be recognized locally at the mobile device, for example by monitoring the state of the windshield wipers, defroster, and headlights, or by recognizing frequent "braking" signals from nearby traffic. In one embodiment, the mobile device interfaces to the vehicle (black box) computer to access vehicle sensors and conditions. Adverse conditions may also be determined centrally and broadcast to the mobile units.

Some prevailing conditions include those in Table II below, along with examples of methods that may be used to detect the condition.

TABLE II

| Condition | Example | Vehicle-based Detection | Infrastructure-Based Detection |
|---|---|---|---|
| Slick pavement | Wet, icy, snowy/slushy, oil | Anti-lock brake sensor | Weather sensors |
| Limited visibility | Rain, snow, fog, sleet, dust | Headlight/wiper/defroster sensors | Weather sensors |
| Road construction | Lane closure | N/A | Emergency services report |
| Object in roadway | Debris | Radar | Emergency services report |
| Accident/incident | Collision, stalled vehicle | Airbag sensor, reports from other vehicles | Emergency services report |
| Dense traffic | Reduced inter-vehicle spacing for prevailing traffic speed/conditions | Radar | Roadside sensors |
| Anomalous driving behavior | Weaving, wrong-way driving | Acceleration sensor | Roadside sensors, vehicle reports |

In some embodiments, the message rate calculation considers the change in the velocity vector of the vehicle, rather than just its magnitude as described above. Consequently, an accelerating (or decelerating) unit would tend to report at a higher rate than a constant-speed unit. Likewise, a unit experiencing a sudden change in direction would report more frequently than one continuing in a straight line.

In some embodiments, the invention allows the sending unit to selectively adjust transmission parameters appropriate to the current conditions, based on the observed channel characteristics, thus improving the probability of message delivery and reducing channel loading. In a broadcast message system, using data obtained by passively monitoring (for example, without polling any of the mobile units) aspects of the local radio and message reception environment, along with the elements of the present invention, the sending device can calculate and utilize superior transmission parameters. The monitored aspects of the environment include at least received message density/channel congestion, and may include other characteristics such as detected collisions or link quality, such as signal to interference ratio and/or signal to noise ratio. The adjusted transmission parameters may include transmit power, error correction codes, such as FEC code rate, and modulation type and/or rate.

Figure 7:
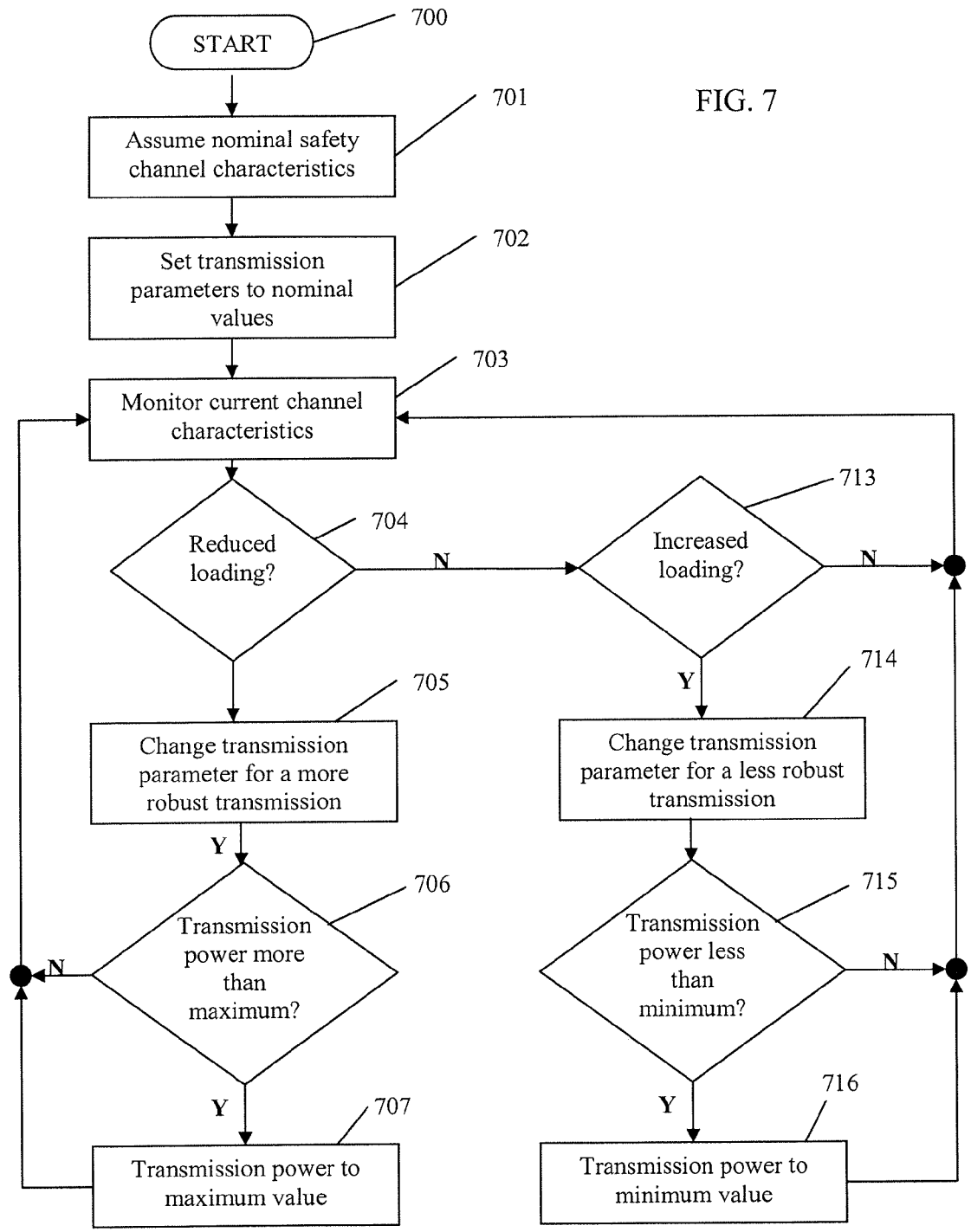
FIG. 7 illustrates an exemplary process flow for transmission parameter determination, according to some embodiments of the present invention.

FIG. 7 illustrates an exemplary process flow for message transmission based on observed channel characteristics, according to some embodiments of the present invention. In block 701, the process initializes its safety metrics/conditions (e.g., modulation type and rate, error correction coding type and rate, and/or transmission power). In block 702, transmission parameters are set to nominal values. For example, the modulation type may be set to QPSK the error correction coding may be set to rate ¾, and/or the transmission power may be set to 100 mW. The safety metrics/conditions and/or the transmission parameters maybe pre-set or programmed in the system, or transmitted to the system as its initial conditions.

In block 703 the process then monitors the current safety and channel characteristics. For example, the number of messages, number of transmitters, received signal level, received signal quality, received signal code rate and modulation rate, channel congestion (per time unit or per space unit or both), and the like are monitored. If the monitored safety factors are reduced from the nominal or previous values (indicating a higher potential for collision) and/or channel loading is reduced (indicating opportunity for more frequent updates) (block 704), the transmission parameters are provisionally changed for a more robust transmission, as shown in block 705. However, if any transmission parameter increase exceeds a maximum predefined ceiling (block 706), that transmission parameter is set to the maximum allowed value, in block 707. If on the other hand, safety factors increase (indicating less risk of collision) and/or channel loading increases (indicating potential for a communications bottleneck) (block 713), the transmission parameters are provisionally changed for a less robust transmission in block 714. The transmission parameters are compared to a predefined floor value in block 715, and prevented from falling below the minimum allowed value in block 716.

For example, consider an environment with multiple mobile devices each transmitting a series of broadcast messages. An example is the US WAVE/DSRC system where vehicles equipped with WAVE radios broadcast safety messages (including status and location) at a nominal rate of 10 per second. This may be a distributed short-range system or a roadside device providing services, and there may be no local controller.

In a low-density environment, devices may broadcast messages robustly. Here, robustness is defined to include one or more of: increased transmission rate, higher transmit power, higher forward error correction code rate, and lower modulation rate. A more robust set of transmission parameters is more likely to result in a successful transmission.

In a high density vehicular environment, a different transmission strategy is desirable. In this environment, it is likely that the channel will become overloaded, resulting in delayed transmissions due to congestion and lost transmissions due to collisions. These effects can be controlled to some degree via the following means.

Decreasing the message transmission rate will reduce the loading on the channel.

Decreasing the FEC rate and/or increasing the modulation rate will decrease the channel time for each transmission, again reducing channel loading.

Decreasing the transmit power will reduce the range of the transmission, increasing the channel frequency reuse efficiency over space.

The last two means have a primary or secondary effect of reducing the range of the message delivery. This is consistent with a dense environment, where only the closest neighbor units may be of interest to a receiver.

Since the units may be mobile, and there is no central controller, the local density of neighbor units may not be known at any time. The present invention gives the transmitter a way to estimate neighbor density, by monitoring message density, and adjust its transmit parameters accordingly.

Figure 8:
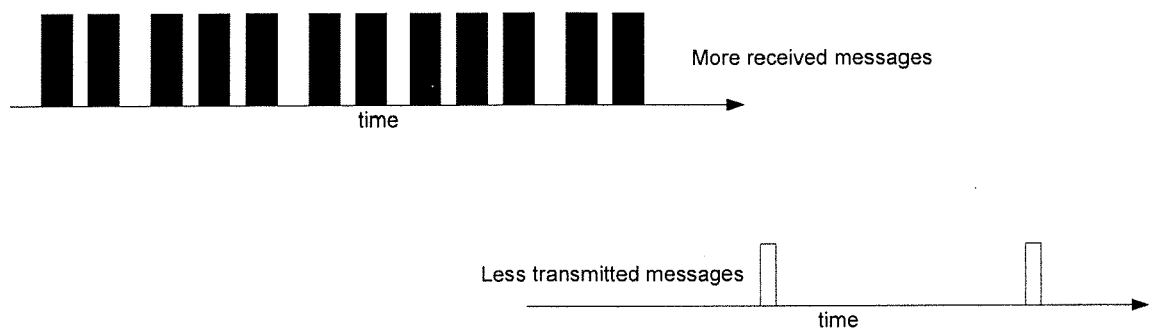
FIG. 8 shows less robust transmission in a dense environment, according to some embodiments of the present invention.
Figure 9:
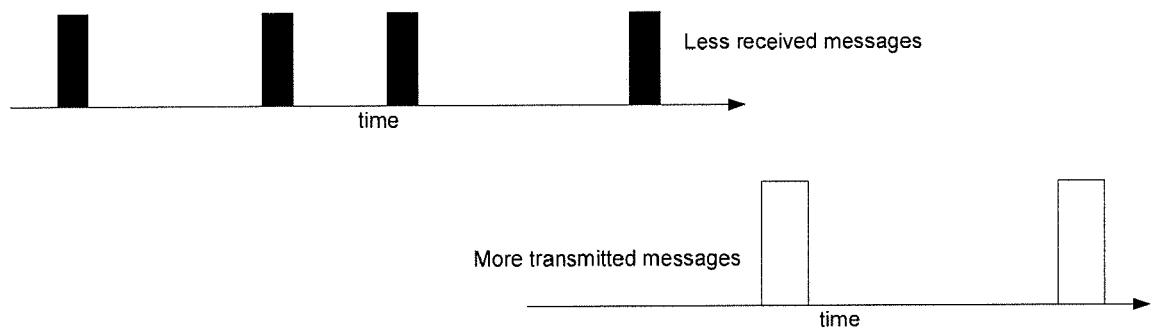
FIG. 9 shows more robust transmission in a sparse environment, according to some embodiments of the present invention.

In the simplest case, the transmitter increases the transmission robustness when less messages are being received from its neighbors in a given timeframe, and decreases transmission robustness when more messages are received in the given timeframe, as shown in FIGS. 8 and 9, respectively. FIG. 8 shows less robust transmission in a dense environment, according to some embodiments of the present invention. As indicated, the top rectangles represent a high density of messages received, for example, in the recent past. The bottom rectangles represent less robust transmissions, for example, lower power, and/or higher modulation rate, which have the effect of reducing channel congestion. That is, less robust transmissions result in shorter range in the dense environment.

FIG. 9 shows more robust transmission in a sparse environment, according to some embodiments of the present invention. Here, the transmitter adjusts its parameters (e.g., higher power, lower modulation rate) for greater robustness. That is, more robust transmissions result in longer range in the sparse environment.

As noted above, more robust transmissions result in a relatively longer range than less robust transmissions. This is appropriate behavior, as the longer range transmissions allow each receiver to collect more total information (i.e., information from further vehicles) when there is less information (i.e., less transmitting units) in the nearby area. In the denser situation, the reduced range ensures that receivers can concentrate their attention on their closest neighbors rather than being distracted by too much information from distant units.

Further embodiments of the present invention can be applied to systems with one or more of the following characteristics:

Unit mobility,

Unit speed and/or position,

Regular message transmissions, adaptation of message frequency,

Type- and Priority-based message discrimination (e.g. long vs. short range, high vs. low priority), Location-aware units, utilization of geographical location based on e.g. GPS, GNSS information embedded in the message of neighboring transmitters, Robustness per time unit controlled per default or by network/roadside units for a certain area and/or time, Robustness per space unit (relative or absolute geographic area) controlled per default or by network/roadside units for a certain geographic zone and/or time, and/or Superposition of both robustness per time unit and per space unit.

In further embodiments of the present invention, the transmitter may consider other channel quality metrics such as signal to interference ratio, in addition to the received message density. Similarly, the transmitter may consider actual physical unit density (e.g., how many vehicles on the roadway) if that information is available, for example, if devices are transmitting their locations. The transmitter may also consider other higher-layer or application-specific parameters. For example, for safety messages, a faster-moving unit would send its messages more robustly than a slow-moving unit, since its information would potentially be of interest to more distant receivers. The transmitter may adjust the transmission parameters differently for different classes of messages. For example, low priority messages may be transmitted less robustly in a high-density environment, whereas high-priority messages may be transmitted robustly regardless of the density.

The examples above show how vehicle speed, or vehicle speed and channel loading, can be used to select an appropriate message rate and/or transmission characteristics or parameters. When multiple factors such as the various adverse conditions are incorporated, the same adjustment mechanisms (maximum rate, minimum rate, speed multiplier factor) may be used to select the appropriate message rate and/or transmission characteristics or parameters. It will be recognized that different adjustment mechanisms could be chosen to produce a comparable effect without changing the nature of the invention.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims.

What is claimed is:

1. A method for dynamically changing transmission parameters of messages broadcast by a vehicle via a broadcast transmission channel, the method comprising:
    collecting vehicle information about the vehicle;
    placing the collected information in a message to be broadcast by the vehicle;
    monitoring broadcast transmission channel characteristics;
    dynamically adjusting the transmission parameters of the message including how often the message to be broadcast via the broadcast transmission channel, based on the monitored broadcast transmission channel characteristics;
    broadcasting the message by the vehicle via the broadcast transmission channel, using the adjusted transmission parameters of the message, and
    a first set of transmission parameters when the broadcast transmission channel is lightly loaded; using a second set of transmission parameters when the broadcast transmission channel is moderately loaded; and using a third set of transmission parameters when the broadcast transmission channel is heavily loaded.

2. The method of claim 1, wherein the transmission parameters of the message include one or more of the group consisting of transmission power, error code rate, and modulation rate, of the message.

3. The method of claim 1, wherein the transmission channel characteristics include one or more of the group consisting of received message density, channel congestion, detected number of message collisions, and link quality.

4. The method of claim 1, further comprising adjusting a transmission rate of the message based on the monitored transmission channel characteristics.

5. The method of claim 1, further comprising monitoring speed of the vehicle; and adjusting transmission rate of the message based on the speed of the vehicle.

6. The method of claim 5, wherein the transmission rate is adjusted such that the transmission rate is decreased when the speed of the vehicle is reduced, and the transmission rate is increased when the speed of the vehicle is increased.

7. The method of claim 1, wherein high-priority messages are broadcast more robustly than low priority messages.

8. The method of claim 1, wherein the transmission channel characteristics include one or more of the group consisting of number of messages, number of transmitters, received signal level, received signal quality, received signal code rate, received signal modulation rate, channel congestion per time unit, and channel congestion per space unit.

9. The method of claim 1, wherein dynamically adjusting the transmission parameters of the message comprises increasing a transmission robustness when less messages are received in a given timeframe, and decreasing the transmission robustness when more messages are received in the given timeframe.

10. The method of claim 1, wherein monitoring transmission channel characteristics comprises monitoring transmission channel characteristics without polling the vehicle.

11. The method of claim 4, further comprising determining a transmission channel loading based on the number of transmission collisions detected in the transmission channel in a given time interval; lowering the transmission rate when the transmission channel loading is heavy; and increasing the transmission rate when the transmission channel loading is light.

12. A mobile device for wirelessly communicating messages broadcast at a transmission rate comprising:
    an input port for receiving vehicle information about a vehicle;
    a radio transceiver for placing the collected information in a message to be broadcast and for receiving and transmitting the broadcast messages;
    a processor for monitoring transmission channel characteristics, dynamically adjusting the transmission parameters of a message including how often the message to be broadcast, based on the monitored transmission channel characteristics; and transmitting the message using the adjusted transmission parameters, and
    a first set of transmission parameters when the broadcast transmission channel is lightly loaded; using a second set of transmission parameters when the broadcast transmission channel is moderately loaded; and using a third set of transmission parameters when the broadcast transmission channel is heavily loaded.

13. The mobile device of claim 12, wherein the transmission parameters of the message include one or more of the group consisting of transmission power, error code rate, and modulation rate, of the message.

14. The mobile device of claim 12, wherein the transmission channel characteristics include one or more of the group consisting of received message density, channel congestion, detected number of message collisions, and link quality.

15. The mobile device of claim 12, wherein the processor further adjusts a transmission rate of the message based on the monitored transmission channel characteristics.

16. The mobile device of claim 12, wherein the processor further monitors speed of the mobile device; and adjusts transmission rate of the message based on the speed of the mobile device.

17. The mobile device of claim 16, wherein the processor decreases the transmission rate when the speed of the mobile device is reduced, and increases the transmission rate when the speed of the mobile device is increased.

18. The mobile device of claim 12, wherein high-priority messages are broadcast more robustly than low priority messages.

19. The mobile device of claim 12, wherein the transmission channel characteristics include one or more of the group consisting of number of messages, number of transmitters, received signal level, received signal quality, received signal code rate, received signal modulation rate, channel congestion per time unit, and channel congestion per space unit.

20. The mobile device of claim 1, wherein the processor dynamically adjusts the transmission parameters of the message by increasing a transmission robustness when less messages are received in a given timeframe, and decreasing the transmission robustness when more messages are received in the given timeframe.

21. The method of claim 1, further comprising broadcasting the adjusted transmission parameters of the message to a plurality of vehicles to be used by the plurality of vehicles for broadcasting messages.

* * * * *